United States Patent
Tseng (10) Patent No.: US 6,575,531 B1
(45) Date of Patent: Jun. 10, 2003

(54) RECLINING CHAIR WITH ADJUSTMENT TELESCOPIC TUBE

(75) Inventor: Chuen-Jong Tseng, Chiayi Hsien (TW)

(73) Assignee: Shin Yeh Enterprise Co., Ltd., Chiayi Hsien (TW)

(*) Notice: Subject to any disclaimer, the term of this patent is extended or adjusted under 35 U.S.C. 154(b) by 0 days.

(21) Appl. No.: 10/040,510

(22) Filed: Jan. 8, 2002

(51) Int. Cl.⁷ ................ A47C 1/02; F16F 1/06
(52) U.S. Cl. ............. 297/320; 297/322; 297/317; 297/375; 267/275; 267/155
(58) Field of Search .................. 297/320, 322, 297/317, 423.33, 375; 188/188.77, 275, 155, 68; 267/275, 155

(56) References Cited

U.S. PATENT DOCUMENTS

| | | | | |
|---|---|---|---|---|
| 545,492 A | * | 9/1895 | Spencer | 188/26 |
| 1,366,904 A | * | 2/1921 | Davis | 474/117 |
| 1,627,220 A | * | 5/1927 | Withrow | 267/275 |
| 4,515,034 A | * | 5/1985 | Porter | 74/501.6 |
| 4,768,829 A | * | 9/1988 | Goldman | 297/317 |
| 5,082,324 A | * | 1/1992 | Harada et al. | 297/83 |
| 5,209,549 A | * | 5/1993 | Chang | 297/320 |
| 5,219,045 A | * | 6/1993 | Porter et al. | 188/67 |
| 5,794,470 A | * | 8/1998 | Stringer | 188/67 |
| 6,253,881 B1 | * | 7/2001 | Andersson | 188/67 |

* cited by examiner

Primary Examiner—Peter M. Cuomo
Assistant Examiner—Sarah C. Burnham
(74) Attorney, Agent, or Firm—Ladas & Parry (57) ABSTRACT

A reclining chair comprises a telescopic tube assembly connected to a seat for adjusting the inclination of the seat and a backrest, and a lock unit mounted on the telescopic tube assembly for locking releasably an inner tube against an outer tube of the telescopic tube assembly. The lock unit includes a torsion spring which has a coiled portion tightly sleeved around the inner tube to lock it against the outer tube adjacent an opening provided on the outer tube, and two arms extending out of the outer tube through the opening from two ends of the coiled portion. An operating unit is connected to the arms for moving the arms so as to unwind the coiled portion and unlock the inner tube, thereby the seat may be pushed forwardly or rearwardly.

4 Claims, 7 Drawing Sheets

RECLINING CHAIR WITH ADJUSTMENT TELESCOPIC TUBE

BACKGROUND OF THE INVENTION

1. Field of the Invention

The present invention relates to a chair, in particular to a reclining chair in which the angle between the seat and backrest can be adjusted.

2. Description of the Related Art

Chairs for reclining purposes, in general, are often of varying types of design due to differences in terms of function. For instance, there are designs which are intended to meet the ergonomic requirement, whereas there are designs which place emphasis on being lightweight, compact and convenient. Still there are designs which emphasize on the adjustability of the angle between the seat and backrest for a user to recline back.

In the past, the structure of chairs with adjustable angle between the seat and backrest generally consists of a horizontally arranged seat, a backrest adjustably mounted on the rear portion of the seat at a predetermined angle, and two side frames mounted on the left and right sides of the seat and backrest, respectively, for supporting the chair uprightly on the ground or floor. The side frames each include a leg mounted on the side edge of the seat for standing on the ground or floor, and an armrest mounted on the top portion of the leg. Such chair structure is further equipped with a mechanism for adjusting the angle between the seat and backrest. For a long time now, such a mechanism has always been achieved by further providing an elongated metal plate fastened along the length of the bottom portion of each armrest, for mounting of the adjustment mechanism on top of the corresponding side frames. Designs which can be considered breakthroughs are rarely seen.

SUMMARY OF THE INVENTION

An object of the present invention, therefore, is to provide a reclining chair with a unique adjustment mechanism.

Accordingly, in one aspect of the present invention, a chair comprises a frame including a seat; a telescopic tube assembly including an outer tube mounted on the frame below the seat and an inner tube mounted movably inside the outer tube, the inner tube having one end extending out of the outer tube and connected pivotally to a front end of the seat, said one end of the inner tube being movable away from the outer tube to incline the seat, the outer tube having an opening; a lock unit mounted on the telescopic tube assembly for locking releasably the inner tube against the outer tube, the lock unit including a torsion spring which has a coiled portion sleeved around the inner tube inside the outer tube adjacent the opening, and two arms extending out of the outer tube through the opening from two ends of the coiled portion, the arms normally extending away from one another so as to cause the coiled portion to be wound tightly around the inner tube; and an operating unit mounted on the frame and connected to the arms for moving the arms toward one another so as to unwind the coiled portion.

According to another aspect of the present invention, a chair comprises a frame which includes a seat, a backrest connected pivotally to a rear end of the seat, a pair of armrests having rear ends respectively and pivotally connected to two sides of the backrest, a pair of armrest supports respectively connected to the armrests opposite to the backrest and extending downwardly and rearwardly to a level lower than the seat, and a connecting bar disposed below the seat and connected between the armrest supports, the armrests being immovable relative to the armrest supports; a telescopic tube assembly including an outer tube connected rigidly to the connecting bar intermediate the armrest supports and below the seat, and an inner tube mounted movably inside the outer tube and having one end extending out of the outer tube and connected pivotally to a front end of the seat opposite to the backrest, said one end of the inner tube being movable away from the outer tube to incline the seat; a lock unit mounted on the telescopic tube assembly for locking releasably the inner tube against the outer tube; and an operating unit mounted on the frame and connected to the lock unit so as to manipulate the lock unit.

BRIEF DESCRIPTION OF THE DRAWINGS

Other features and advantages of the present invention will become apparent in the following detailed description of the preferred embodiment with reference to the accompanying drawings, in which.

DETAILED DESCRIPTION OF THE PREFERRED EMBODIMENT

A preferred embodiment of the chair according to the present invention will now be described with reference to FIGS. 1, 2, 3 and 4. As shown, the reclining chair 1 generally comprises a lower frame 2 adapted to be stood on the ground or floor to support the entire chair 1, and an upper frame 3 rotatably mounted onto the lower frame 2. The upper frame 3 includes a backrest 4, a seat 5 and an adjustment mechanism for varying the angle between the backrest 4 and seat 5, which will be described in greater detail below.

While the overall structure of the chair 1 includes the lower frame 2 to support the upper frame 3, the present invention is not limited thereto. The upper frame 3 may be combined with any other leg structure for stably supporting the upper frame 3.

Figure 1:
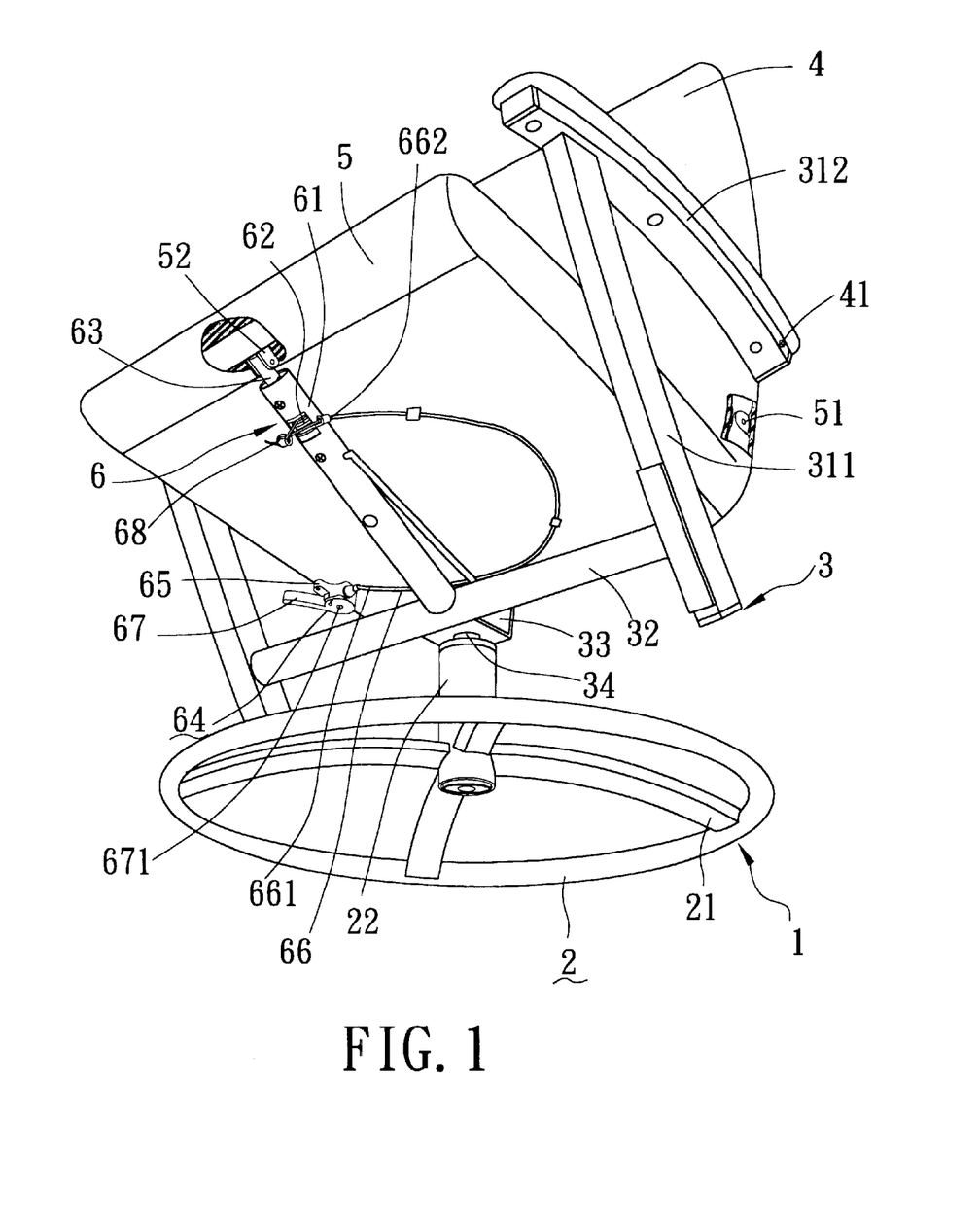
FIG. 1 is a perspective view of a preferred embodiment of the reclining chair according to the present invention.
Figure 2:
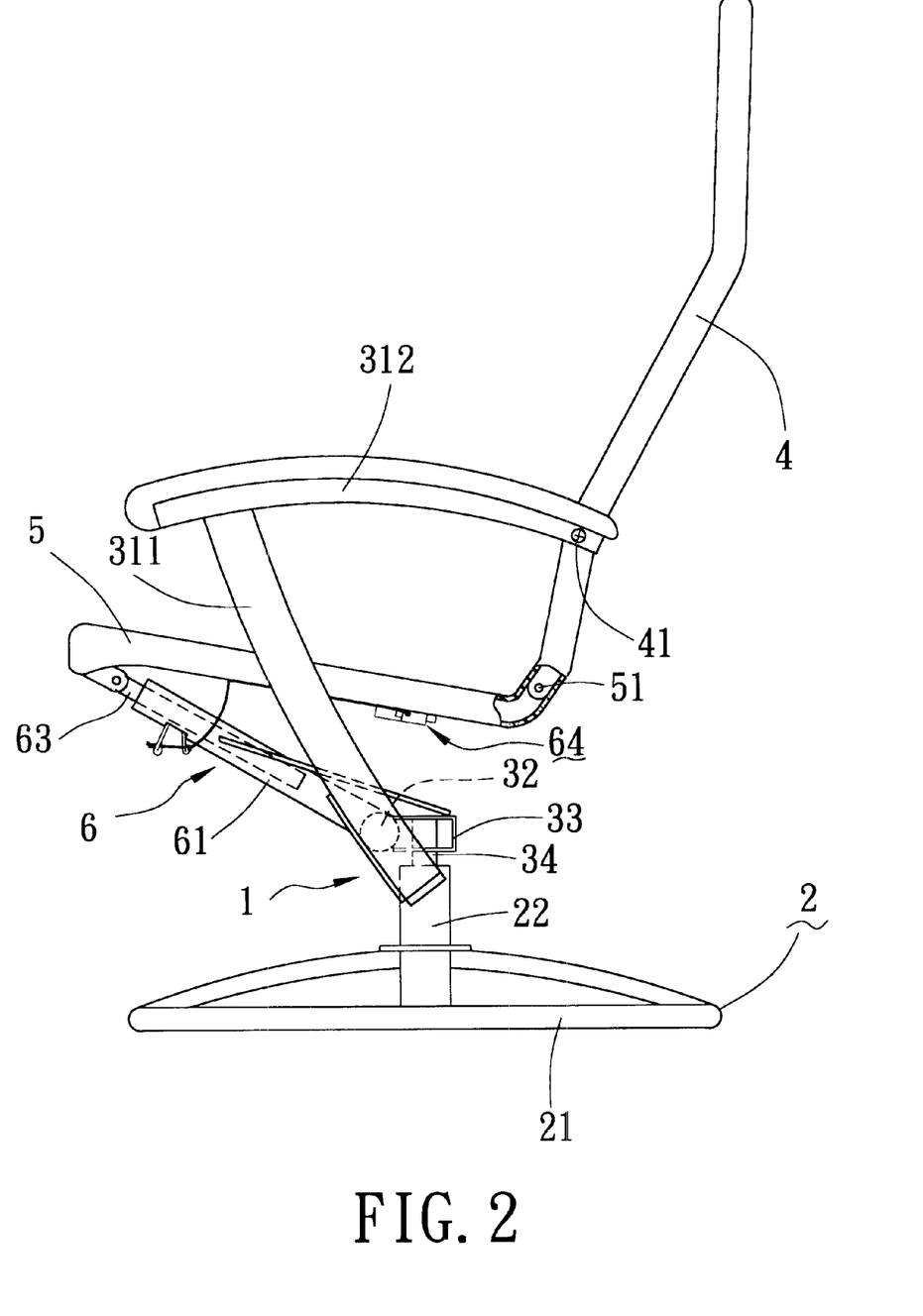
FIG. 2 is a side view of the reclining chair shown in FIG. 1.

The lower frame 2 has a base 21 adapted to be placed on the floor or ground, and an upstanding tube 22 provided in the center of the base 21.

The upper frame 3 further includes a connecting bar 32, a support head 33 attached to the connecting bar 32 at the middle, rear portion thereof, and a downwardly projecting shaft 34 attached to the central part of the support head 33. The shaft 34 is rotatably inserted into the upstanding tube 22 of the lower frame 2, so that the entire upper frame 3 is rotatably mounted onto the lower frame 2. The upper frame 3 further includes an armrest support 311 and an armrest 312 which are integrally connected. The armrest supports 311 each have a lower end connected rigidly to the connecting bar 32. The armrests 312 each have a front end portion connected to the upper end of the armrest support 311. The armrests 312 extend rearwardly to their rear end portions in an arcuate form for providing a support for a user's arms and/or hands. The armrests 312 are not movable or pivotal relative to the armrest supports 311.

The backrest 4 has two sides to which the two rear end portions of the two armrests 312 are pivoted near the middle portion of the backrest, respectively, by means of first pivot members 41.

The seat 5 has a rear end portion which is pivotally connected at the two sides thereof to the bottom end portion of the backrest 4, using second pivot members 51.

Figure 3:
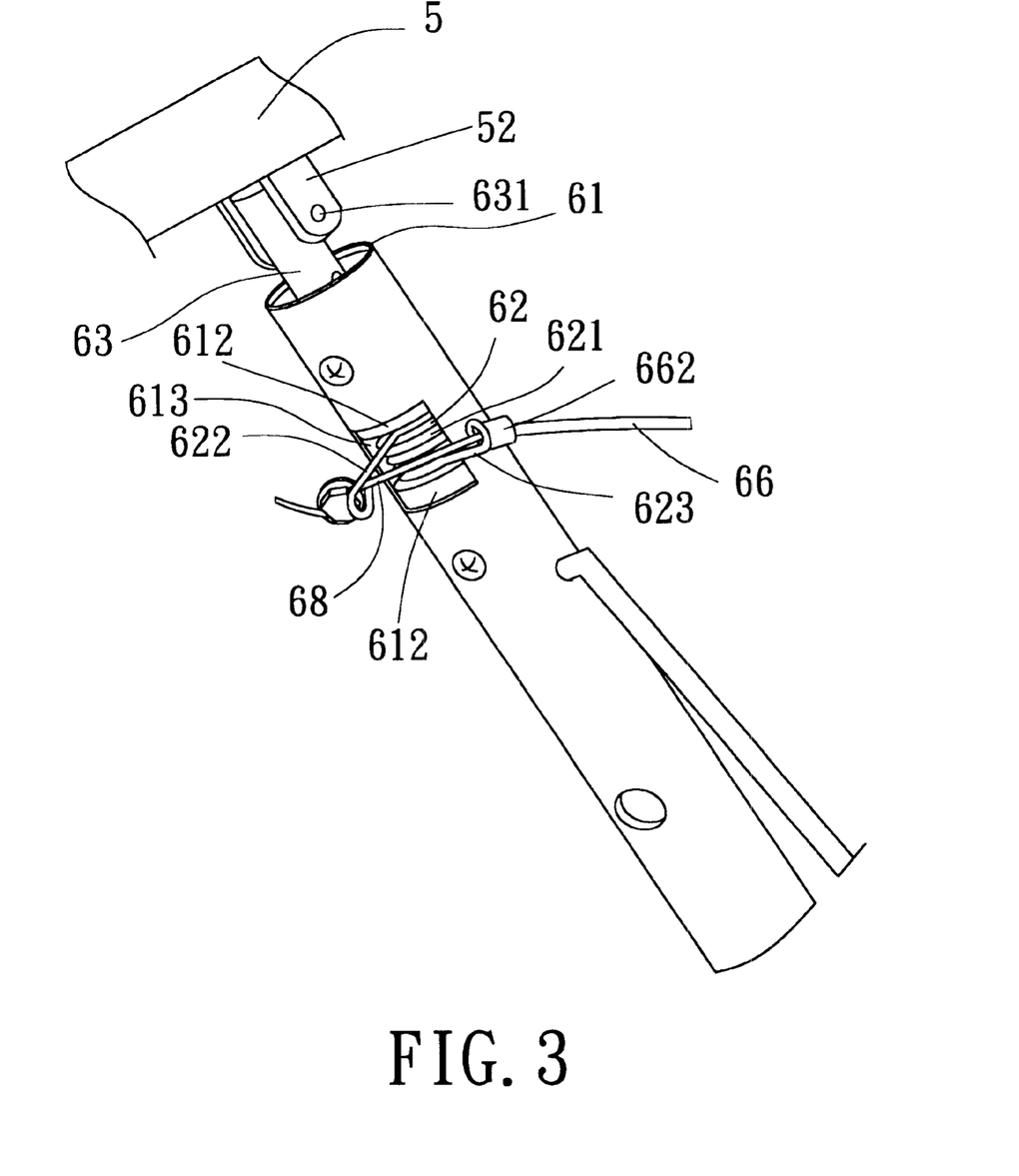
FIG. 3 is an enlarged, perspective view of a part of the adjustment mechanism of the reclining chair shown in FIG. 1.
Figure 4:
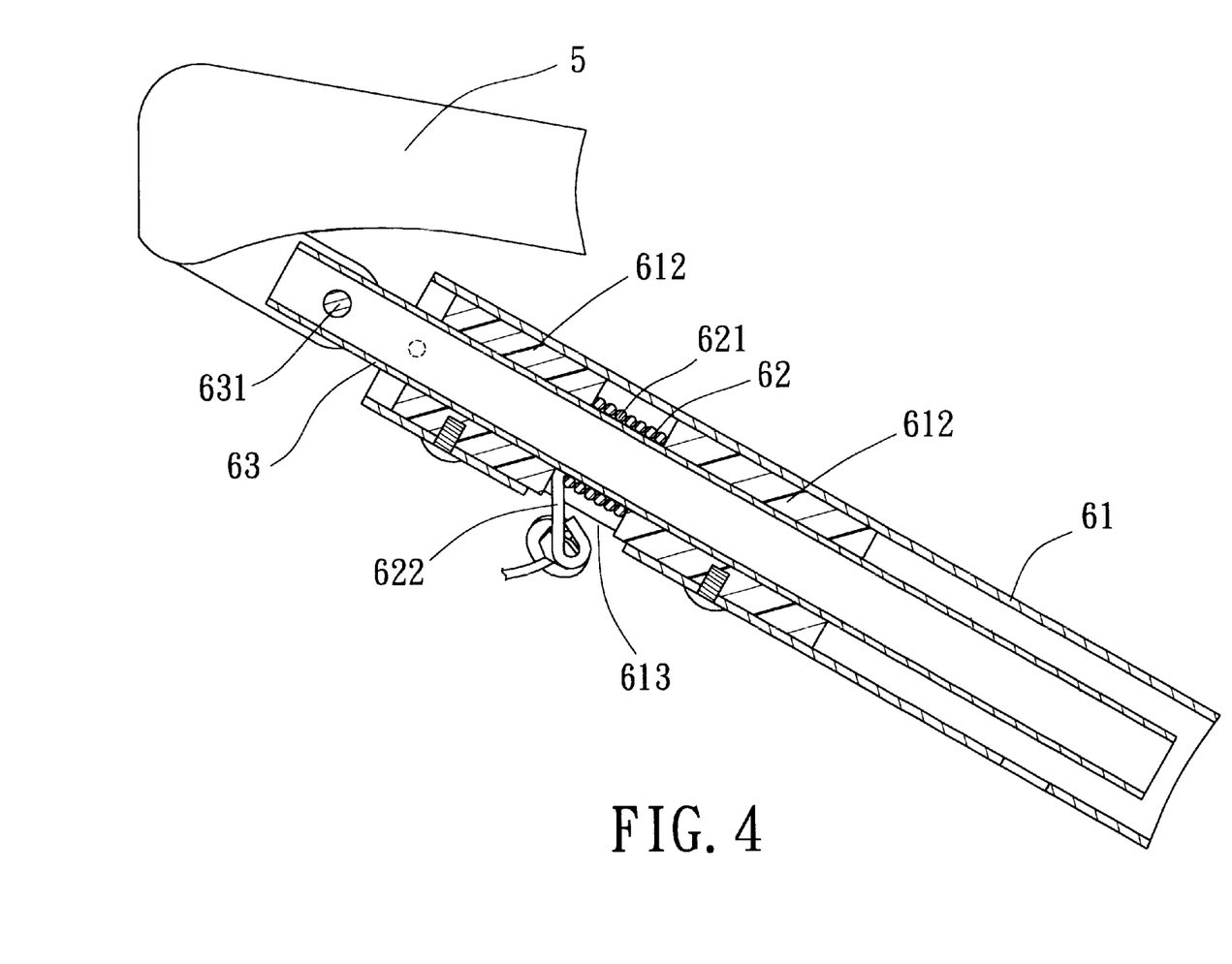
FIG. 4 is a sectional side view of the adjustment mechanism shown in FIG. 3.

Below the seat 5 are provided a telescopic tube assembly 6 which has an outer tube 61 and an inner tube 63 movably mounted inside the outer tube 61, a lock unit including a torsion spring 62 for locking the inner tube 63 against the outer tube 61, and an operating unit 64.

The outer tube 61 extends rearwardly to connect rigidly to the middle portion of the connecting bar 32 of the upper frame 3. The outer tube 61 is provided with two spaced-apart bushings 612 fixed therein and has a rectangular opening 613 bored on the wall at a front end portion thereof, the opening 613 being aligned with the space substantially between the two bushings 612.

The torsion spring 62 of the lock unit consists of a coiled portion 621 having a predetermined number of windings and diameter, and two arms 622,623 extending outwardly from the two ends of the coiled portion 621, respectively. The coiled portion 621 is mounted in the outer tube 61 around the inner tube 63 adjacent the opening 613, with the two arms 622,623 extending out of the opening 613 and abutting against the front and rear edges of the opening 613, respectively. The coiled portion 621 is restricted by the two bushings 612 which are exposed in part at the opening 613.

The inner tube 63 is axially retractable within the outer tube 61, passing through the bushings 612 and the torsion spring 62, and is tightly wound around by the coiled portion 621 of the torsion spring 62 and clamped in position. Furthermore, a front end portion of the inner tube 63 protrudes out of the outer tube 61 and is pivotally connected, by a third pivot member 631, between a pair of lugs 52 extending from the bottom of the front portion of the seat 5.

Figure 5:
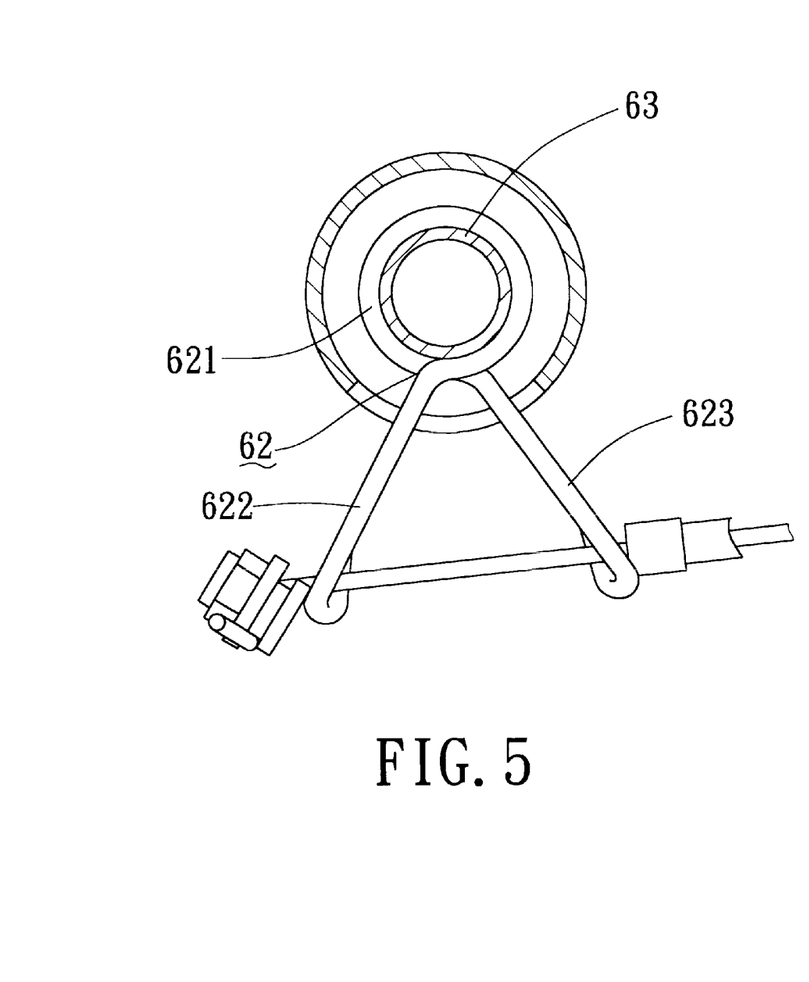
FIG. 5 is a sectional view of the adjustment mechanism shown in FIG. 4, showing an inner tube tightly wound around and clamped in position by a torsion spring.
Figure 6:
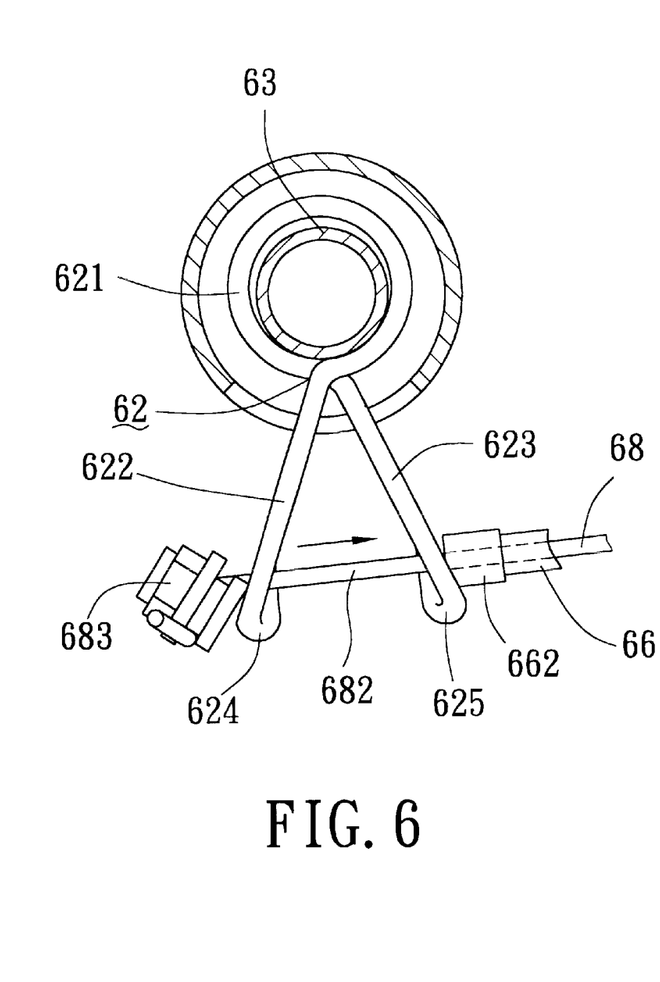
FIG. 6 is the same view as FIG. 5, but with the torsion spring being unwound.

It can be appreciated from FIG. 5 that, when the inner tube 63 is inserted in the coiled section 621 of the torsion spring 62 and no force is applied to the two arms 622,623, the coiled portion 621 is tightly wound around the inner tube 63 such that the inner tube 63 cannot be retracted or displaced axially relative to the outer tube 61. When force is applied to the arms 622,623 turning the arms 622,623 in a direction opposite to the winding direction of the coiled portion 621, the coiled portion 621 is unwound in the opposite direction thus enlarging its diameter, as shown in FIG. 6. At this point, the inner diameter of the coiled portion 621 is distinctly larger than the outer diameter of the inner tube 63 and, in this state, the inner tube 63 can be moved or displaced axially. In regard to the operation of the two arms 622, 623, this can be accomplished through the operating unit 64.

The operating unit 64 is primarily used for moving the two arms 622,623 of the torsion spring 62 toward one another so as to unwind the coiled portion 621.

Figure 7:
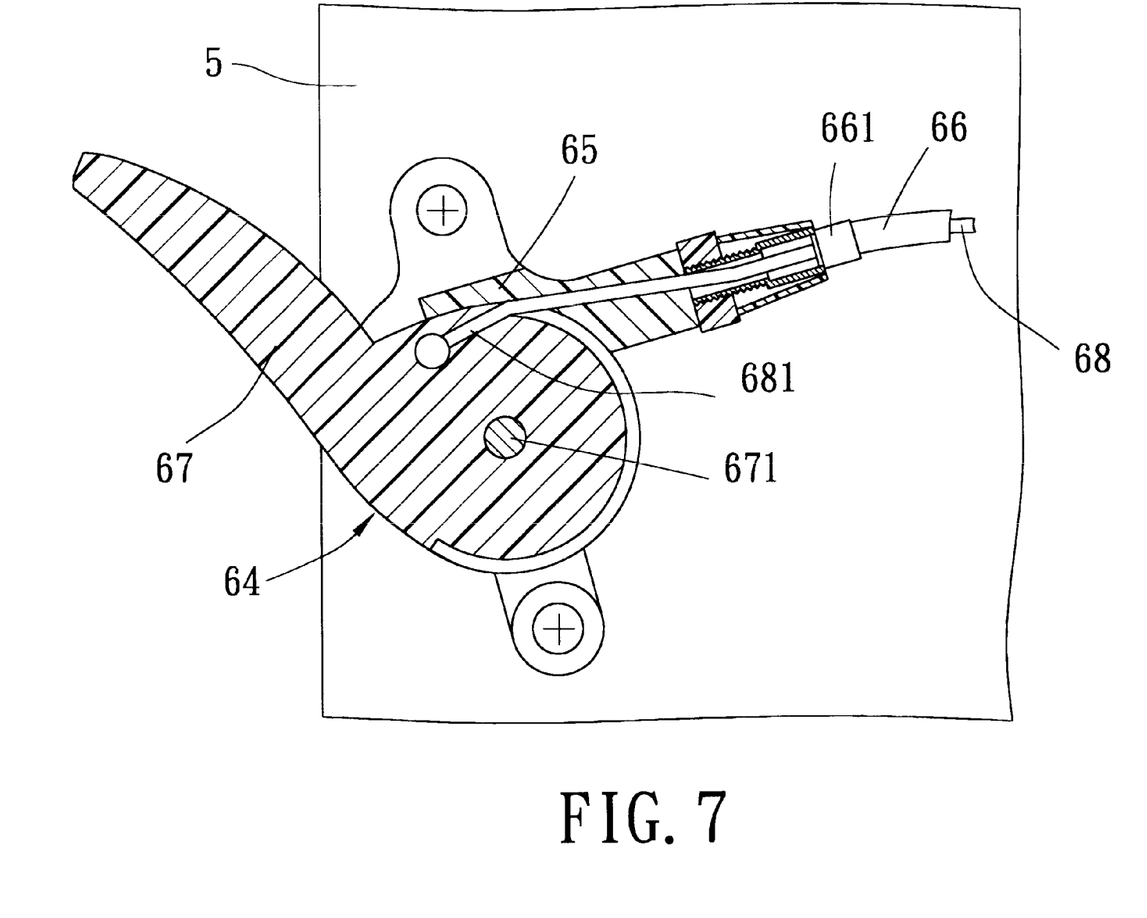
FIG. 7 is a sectional view of the operating unit shown in FIG. 1.

Referring to FIG. 7 in conjunction with FIGS. 1, 5 and 6, the operating unit 64 of the chair according to the preferred embodiment has a fixed base 65, a cable sleeve 66, an operating lever 67 and a cable 68. The fixed base 65 is secured to the bottom of the seat 5.

The cable sleeve 66 has one end portion 661 attached to an end of the fixed base 65, and another end portion 662 (best shown in FIGS. 1 and 6) abutting against the arm 623 of the torsion spring 62. That is, the end portions 661,662 of the cable sleeve 66 are positioned restrictively between the fixed base 65 and the arm 623, respectively.

The operating lever 67 is movably attached to the fixed base 65 by a fourth pivot member 671, with an outer end of the lever 67 protruding out from under the seat 5, to be easily within reach of and manipulated by a user's hand.

The cable 68 is sleeved into the cable sleeve 66, with a first end 681 extending out of the cable sleeve 66 and being fixed to the lever 67, and a second end 682 extending out of the cable sleeve 66 and being connected to the two arms 622,623 of the torsion spring 62. The connection of the second end 682 and the two arms 622,623 is made by bending the two arms 622,623 into loops 624,625, passing movably the second end 682 through the loops 624,625, and providing a block member in the form of a nut 683 at one side of the loop 624. The nut 683 is of a size large enough to bar the nut 683 from passing through the loop 624.

Figure 8:
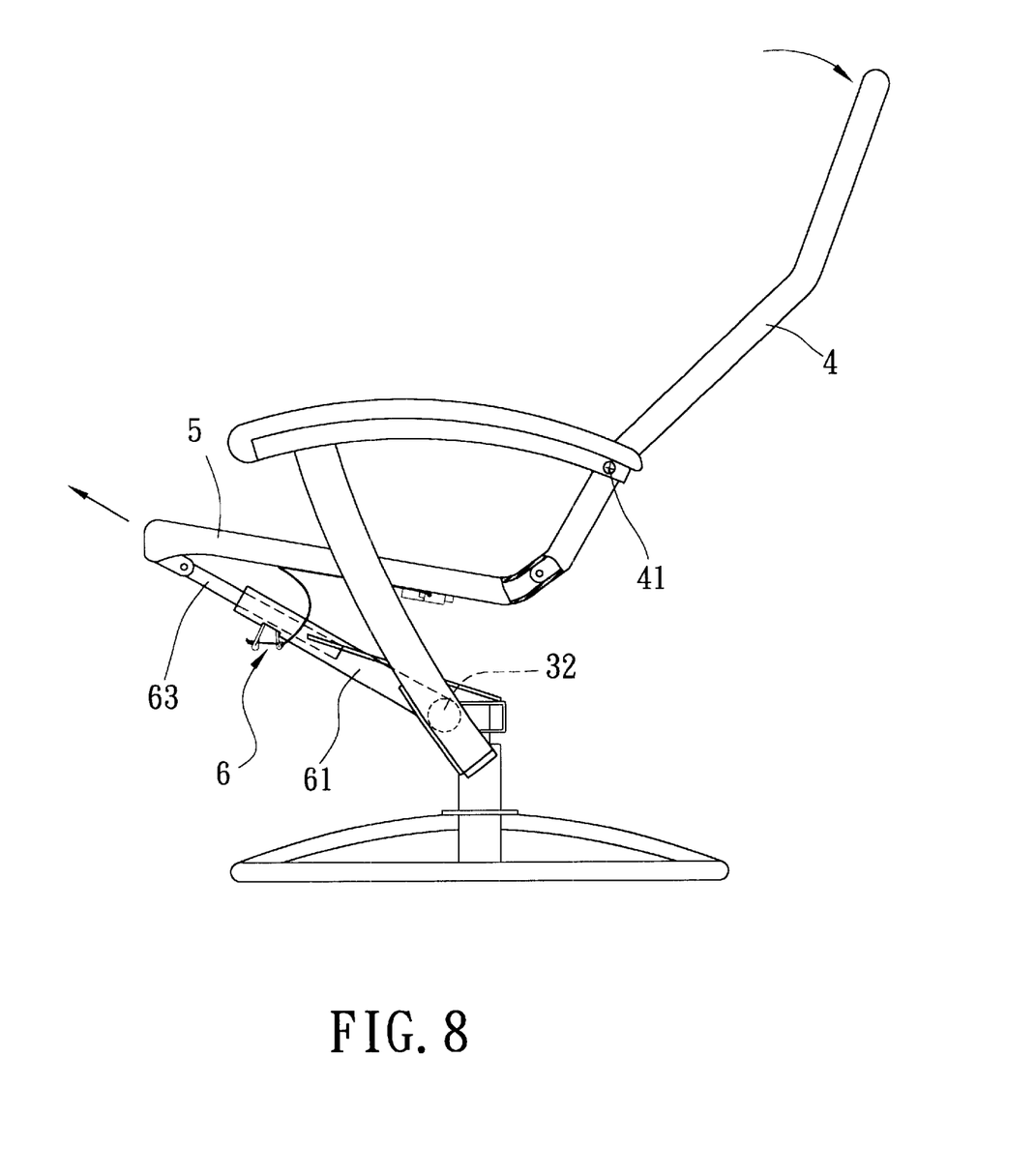
FIG. 8 is the same view as FIG. 2, but with the backrest being inclined rearward.

As shown in FIG. 6, when the operating lever 67 of the operating unit 64 is operated and the cable 68 is thus pulled, the nut 683 pushes against the arm 622 toward the arm 623, thereby unwinding and loosening the coiled portion 621, and unlocking the inner tube 63. At this point, the user may push either forwardly or rearwardly the seat 5 which is supported by the inner tube 63, thereby the seat 5 can be moved forwardly or rearwardly along the extending direction of the inner tube 63. During the forward or rearward movement of the seat 5, the lower end portion of the backrest 4 will be driven to move forwardly or rearwardly, causing the entire backrest 4 to turn about the first pivot members 41, thereby changing the angle between the backrest 4 and the seat 5. The condition of the seat 5 after being displaced forwardly is shown in FIG. 8. Further, since the outer tube 61 of the telescopic tube assembly 6 is connected onto the connecting bar 32 in an upwardly inclined arrangement, when the front end portion of the seat 5 is pushed forwardly for displacement, the backrest 4 will correspondingly be raised slightly upwardly, and the backrest 4 is moved such that an upper end portion thereof swings rearwardly and downwardly.

Meanwhile, when the pulling force is removed from the cable 68, the entire torsion spring 62 is restored to it original state of being wound tightly around the inner tube 63. The operating lever 67 is likewise restored to its original position.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A chair comprising:
    a frame including a seat;
    a telescopic tube assembly including an outer tube mounted on said frame below said seat and an inner tube mounted movably inside said outer tube, said inner tube having one end extending out of said outer tube and connected pivotally to a front end of said seat, said one end of said inner tube being movable away from said outer tube to incline said seat, said outer tube having an opening;

a lock unit mounted on said telescopic tube assembly for locking releasably said inner tube against said outer tube, said lock unit including a torsion spring which has a coiled portion sleeved around said inner tube inside said outer tube adjacent said opening, and first and second arms extending out of said outer tube through said opening from two ends of said coiled portion, said arms normally extending away from one another so as to cause said coiled portion to be wound tightly around said inner tube; and an operating unit mounted on said frame and connected to said arms for moving said arms toward one another so as to unwind said coiled portion;

wherein said operating unit includes an operating lever mounted on said frame, and a cable having a first cable end connected to and operable by said lever and a second cable end fixed to one of said arms of said torsion spring to provide a pulling force applied through said lever;

wherein said operating unit further includes a cable sleeve receiving said cable, said cable sleeve having said first cable end positioned adjacent said operating lever and said second cable end abutting against and positioning said second arm; and wherein each of said arms has a free end formed into a loop, said cable extending through said loops of both of said arms, said first cable end of said cable having a block member attached thereto to block said first cable end from being released through said loop of one of said arms.

2. The chair as claimed in claim 1, wherein said lock unit further includes two bushings disposed around said inner tube on two sides of said coiled portion and fixed within said outer tube so as to limit said coiled portion from moving axially and to retain said coiled portion adjacent said opening.

3. The chair as claimed in claim 1, wherein said frame further includes a backrest connected pivotally to a rear end of said seat opposite to said front end of said seat, a pair of armrests having rear ends respectively and pivotally connected to two sides of said backrest, a pair of armrest supports respectively connected to said armrests opposite to said backrest and extending downwardly and rearwardly to a level lower than said seat, and a connecting bar disposed below said seat and connected between said armrest supports, said outer tube being connected rigidly to said connecting bar intermediate said armrest supports and extending therefrom upwardly and forwardly.

4. The chair as claimed in claim 3, wherein said frame further includes a base and an upstanding tube extending upward from said base, said connecting bar having a downwardly extending shaft mounted rotatably on said upstanding tube.

* * * * *